United States Patent [19]

Bianchi

[11] 4,235,087
[45] Nov. 25, 1980

[54] KEY STRUCTURE HAVING A COATED GRIP
[75] Inventor: Camillo Bianchi, Conegliano, Italy
[73] Assignee: Silca S.p.A., San Vendemiano, Italy
[21] Appl. No.: 43,207
[22] Filed: May 29, 1979
[30] Foreign Application Priority Data Nov. 20, 1978 [IT] Italy .............................. 23336/78[U]

[51] Int. Cl.³ ............................................ E05B 19/04
[52] U.S. Cl. ......................................... 70/395; 70/408
[58] Field of Search ................... 70/408, 395, 393, 406
[56] References Cited

U.S. PATENT DOCUMENTS

| 2,653,492 | 9/1953 | Abrams | 70/408 |
| 3,895,508 | 7/1975 | Cresniarski | 70/408 |

FOREIGN PATENT DOCUMENTS

| 2739062 | 3/1978 | Fed. Rep. of Germany | 70/408 |
| 2712759 | 9/1978 | Fed. Rep. of Germany | 70/408 |
| 2149008 | 3/1973 | France | 70/408 |

Primary Examiner—Robert L. Wolfe
Attorney, Agent, or Firm—Guido Modiano; Albert Josif

[57] ABSTRACT

A covered-grip key includes a flat head wherefrom extends an elongated shaft. In the head there are formed a pair of spaced apart holes interconnecting the two faces of the head and therethrough the joining portions of the two layers covering the two faces of the flat head extend.

4 Claims, 4 Drawing Figures

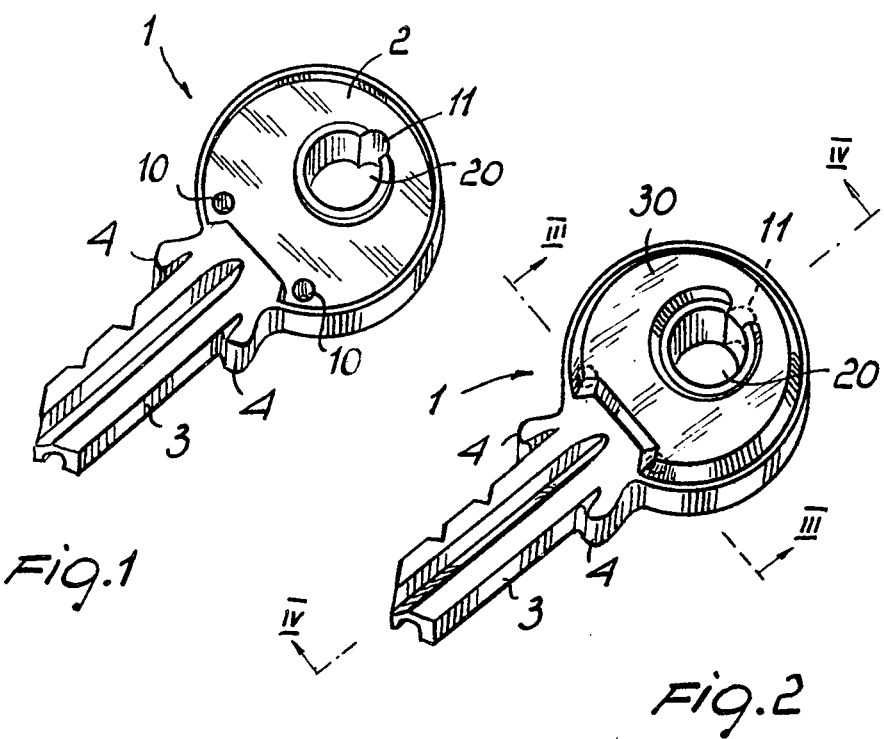
Fig.1
Fig.2
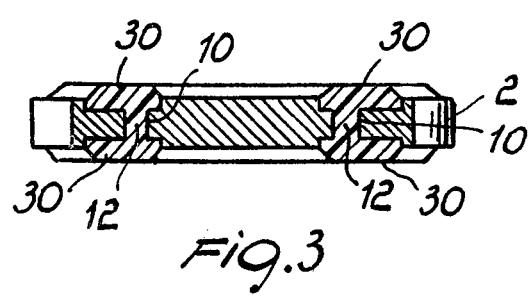
Fig.3
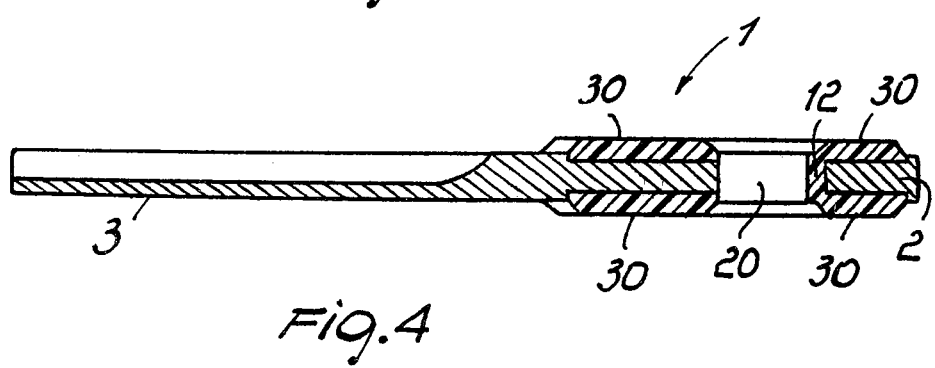
Fig.4

KEY STRUCTURE HAVING A COATED GRIP

BACKGROUND OF THE INVENTION

This invention relates to a key structure having a covered, or coated, grip.

Wider commercial acceptance are enjoying lock keys having their flat grip portion coated or covered with layers, in general of different colors, such as to make them more easily recognizable.

This covering or coating of the key grip has been effected heretofore in a variety of ways which have not always satisfactorily met the above user's requirement; among these are coverings obtained through the application of layers of a plastics material to both faces of the key grip, with the interposition of an adhesive material layer, or those providing complete embedment of the key grip in a layer of a plastics material. Both such coverings have been only partially successful, the former because in addition to being expensive it is also prone to a separation of the covering layers, and the latter because it is liable to damage on account of its enclosing the peripheral edges of the key grip as well.

In an attempt to eliminate the above shortcomings, keys have been marketed wherein the covering or coating is accomplished by molding covering layers onto the key grip. These layers are joined together through notches formed at the peripheral edge of the key grip, which notches, during the molding process, are also filled with the plastics material, thereby the two layers are caused to merge into a single body.

That approach, while representing an improvement over conventional methods, has failed to eliminate all of the manufacturing problems, since in general there still remain flashes at the peripheral passages to be removed by a subsequent triming operation.

SUMMARY OF THE INVENTION

Thus, it is an object of this invention to eliminate the past drawbacks by providing a key structure having a covered or coated grip, which permits a stable and reliable application of the covering layers without requiring any further finishing steps after the plastics material layers have been applied.

It is another object of the invention to provide a covered or coated grip key structure affording considerable simplification of the manufacturing process as well as an improved quality final product.

A further object of this invention is to provide a key structure which can be easily manufactured from commercially available materials, and is highly competitive from a merely economical standpoint.

These and other objects, such as will be apparent hereinafter, are achieved by a key structure having a covered or coated grip, including a flat head, with two opposite faces, an elongated shaft extending from said flat head, characterized in that it comprises in said head a pair of spaced apart through holes, said through holes interconnecting the two faces of said flat head, two layers covering said two faces of said flat head, and joining portions extending through said holes and integrally formed with said layers.

BRIEF DESCRIPTION OF THE DRAWING

Further features and advantages will be more clearly understood by making reference to the following detailed description of a key structure having a covered or coated grip, illustrated by way of example and not of limitation in the accompanying drawing, where:

FIG. 1 shows schematically a perspective view of this key before the application of the grip covering layers;

FIG. 2 shows the same key after the grip covering layers have been applied;

FIG. 3 is a sectional view taken along the line III—III of FIG. 2; and

FIG. 4 is a sectional view taken along the line IV—IV of FIG. 2.

DESCRIPTION OF A PREFERRED EMBODIMENT

With reference to the drawing figures, the key structure of this invention, which is indicated generally at 1, comprises in a conventional manner a flat grip or head 2 wherefrom an elongated shaft or body or stem 3 extends which will be indented to fit a specific lock; at the end of the elongated shaft 3 next to the grip, detents 4 are provided.

A unique feature of the key according to this invention is that the key flat grip 2 is formed with a pair of through holes, indicated at 10, which are spaced apart from each other and substantially located at the connection area between the shaft or stem 3 and grip 2.

Moreover, at the hole 20 for securing the key in a key chain, a peripheral notch or slot 11 is provided which extends through the full thickness dimension of the grip 2.

On the two faces of the grip 2 covering layers indicated at 30 are molded which will be of various colors; the cited through holes 10, as well as the notch 11, have the very important function of allowing the plastics material composing the covering layers 30 to flow from one face of the grip to the other, such that the layers are securely joined together through said joining portions, indicated at 12, which occupy the inside of the holes 10 and notch 11. This solution results in the two covering layers, along with the joining portions 12, becoming a single integral piece, thereby the covering layers cannot separate from each other and from the key grip. Furthermore, the covering layers 20 are so constructed as to leave the peripheral side edges of the grip free, thereby the covering layers are less likely to be damaged in handling, such damage occurring more frequently at said outer edges.

It should be further noted that the positioning of the holes and notch in the grip is extremely important; in fact, and as mentioned already, the holes are provided at the root of the elongate shaft, whereas the notch is located at the hole intended for hooking the key to a key chain: thus, the three resulting joining portions happen to be located substantially at the vertices of an isosceles triangle inscribed within the outline shape intended to be covered by the covering layers, which accomplishes a stable connection of the layers to each other and to the key grip.

It should be added, for completeness sake, that the holes and notches are directly executed during the shaping process of the metal blank constituting the key grip and elongate shaft or body.

Also to be noted is that the grip 2 may have any desired configuration, e.g. to suit the different key grip configurations selected by the manufacturer of the bolt or lock for the original key set.

In practicing the invention, the materials used, while the best results have been obtained by employing a thermoplastic material, and the dimensions may be any ones to suit individual applicational requirements.

I claim:

1. A key structure having a covered, or coated, grip, including a flat head, an elongated shaft extending from said flat head, characterized in that it comprises in said head a pair of spaced apart through holes interconnecting the two faces of said flat head, two layers covering said two faces of said flat head and joining portions extending through said holes and integrally formed with said layers.

2. A key structure according to claim 1, comprising a hole for securing said key in a key chain and characterized in that it comprises a notch formed at the edge area of said hole for securing said key in a key chain, one of said joining portions adapted for joining said covering layers extending through said notch.

3. A key structure according to claim 1, characterized in that said hole pair are located at the root or connection area of said elongate shaft to said flat head.

4. A key structure according to claim 1, characterized in that said pair of through holes and said notch are located at the vertices of an isosceles triangle inscribed within the outline shape of said covering layers.

* * * * *